(12) United States Patent
Won et al.

(10) Patent No.: US 10,449,824 B2
(45) Date of Patent: Oct. 22, 2019

(54) AIR CONDITIONING MODULE

(71) Applicant: Hanon Systems, Daejeon-si (KR)

(72) Inventors: Jong Bo Won, Daejeon-si (KR); Sang Gu Woo, Daejeon-si (KR); Dong Kyu Lee, Daejeon-si (KR); Tae Yong Park, Daejeon-si (KR); Yong Nam Ahn, Daejeon-si (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/572,713

(22) PCT Filed: Nov. 21, 2016

(86) PCT No.: PCT/KR2016/013392
§ 371 (c)(1),
(2) Date: Nov. 8, 2017

(87) PCT Pub. No.: WO2017/090942
PCT Pub. Date: Jun. 1, 2017

(65) Prior Publication Data
US 2018/0251002 A1      Sep. 6, 2018

(30) Foreign Application Priority Data

Nov. 27, 2015   (KR) .................... 10-2015-0167534
Nov. 27, 2015   (KR) .................... 10-2015-0167538

(51) Int. Cl.
*B60H 1/00*      (2006.01)

(52) U.S. Cl.
CPC ...... *B60H 1/00028* (2013.01); *B60H 1/00521* (2013.01); *B60H 1/00528* (2013.01); *B60H 2001/00107* (2013.01); *B60H 2001/00135* (2013.01)

(58) Field of Classification Search
CPC .. B60H 1/00; B60H 1/00028; B60H 1/00899; B60H 1/00849; B60H 1/00264; B60H 1/00671; B60H 1/00528; B60H 2001/00178; B60H 2001/00107; B60H 1/3229; B60H 2001/00135
See application file for complete search history.

(56) References Cited

U.S. PATENT DOCUMENTS

| 3,834,451 A * | 9/1974 | Kozinski ............ B60H 1/00057 165/43 |
| 6,138,749 A * | 10/2000 | Kawai ................ B60H 1/00064 165/204 |
| 2006/0175050 A1 | 8/2006 | Kang et al. |

(Continued)

FOREIGN PATENT DOCUMENTS

| KR | 20130011304 A | 1/2013 |
| KR | 20130050456 A | 5/2013 |

(Continued)

*Primary Examiner* — Ana M Vazquez
(74) *Attorney, Agent, or Firm* — Shumaker, Loop & Kendrick, LLP; James D. Miller

(57) ABSTRACT

An air conditioning module, which can perform cooling and heating through a single module, which is capable of being compact-sized, which can prevent problems caused by condensate water because the condensate water can be easily discharged out, and which can control all of two doors for heating and cooling by a link member and an actuator.

18 Claims, 13 Drawing Sheets

(56) References Cited

U.S. PATENT DOCUMENTS

| | | | |
|---|---|---|---|
| 2008/0190120 A1* | 8/2008 | Marciano | B63J 2/04 62/77 |
| 2014/0123696 A1* | 5/2014 | Kim | F25B 13/00 62/498 |
| 2016/0355072 A1* | 12/2016 | Park | B60H 1/00057 |

FOREIGN PATENT DOCUMENTS

| | | |
|---|---|---|
| KR | 101361039 B1 | 2/2014 |
| WO | 2013002529 A2 | 1/2013 |

* cited by examiner (a)

(b)

AIR CONDITIONING MODULE

CROSS-REFERENCE TO RELATED PATENT APPLICATIONS

This patent application is a United States national phase patent application based on PCT/KR2016/013392 filed Nov. 21, 2016, which claims the benefit of Korean Patent Application No. 10-2015-0167534 filed Nov. 27, 2015 and Korean Patent Application No. 10-2015-0167538 filed Nov. 27, 2015, the entire disclosures of which are hereby incorporated herein by reference.

TECHNICAL FIELD

The present invention relates to an air conditioning module, and more particularly, to an air conditioning module, which can perform cooling and heating through a single module, which is capable of being compact-sized due to an evaporator and a condenser whose certain parts are respectively located at an upper part and a lower part in a vertical direction, which can prevent problems caused by condensate water because the condensate water can be easily discharged out, and which can control all of two doors for heating and cooling by actuating means.

BACKGROUND ART

An air conditioner for a vehicle is a car part, which is installed in a vehicle for the purpose of cooling or heating the interior of the vehicle in the summer season or the winter season or removing frost from a windshield in the rainy season or the winter season to thereby secure a driver's front and rear visual fields. Such an air conditioner typically includes a heating device and a cooling device together, so that it can heat, cool or ventilate the interior of the vehicle through the steps of selectively introducing the inside air or the outside air into the air conditioner, heating or cooling the introduced air, and blowing the heated or cooled air into the vehicle.

FIG. 1 is a schematic diagram showing an example of a conventional air conditioner for a vehicle. The conventional air conditioner for the vehicle includes: an air-conditioning case 10 which has vents 11, 12 and 13 adjusted in the degree of opening by doors 11d, 12d and 13d; a blowing part 14 connected to an inlet of the air-conditioning case 10 to blow outside air; an evaporator E and a heater core H disposed inside the air-conditioning case 10; and a temp door 15 for adjusting the degree of opening of a cooled air passageway and a heated air passageway of the air-conditioning case 10. When a cooling cycle is operated, the temp door 15 opens the cooled air passageway and closes the heated air passageway. Therefore, the air blown by the blowing part 14 exchanges heat with refrigerant flowing inside the evaporator E and is changed into cooled air while passing through the evaporator E, and then, is discharged to the interior of the vehicle through the opened vents 11, 12 and 13 so as to cool the interior of the vehicle. Moreover, when a heating cycle is operated, the temp door 15 closes the cooled air passageway and opens the heated air passageway, the blown air exchanges heat with cooling water flowing inside the heater core H while passing the heater core H through the heated air passageway and is changed into heated air, and then, is discharged to the interior of the vehicle through the vents 11, 12 and 13 so as to warm the interior of the vehicle.

In this instance, in order to supply cold refrigerant to the first evaporator, as shown in FIG. 2, a compressor 1 which compresses and sends refrigerant, a condenser 2 which condenses the refrigerant of high pressure sent from the compressor 1, an expansion valve 3 for throttling the refrigerant condensed and liquefied in the condenser 2; an evaporator E for exchanging heat between the liquefied refrigerant of low pressure throttled by the expansion valve 3 and evaporating the refrigerant to cool the air discharged to the interior of the vehicle due to heat absorption by evaporative latent heat; and refrigerant pipes 5 through which the compressor 1, the condenser 2, the expansion valve 3 and the evaporator E are connected with one another. In the meantime, as described above, the evaporator E is disposed inside the air-conditioning case 10, the condenser 2 is located at the front of the vehicle in order to cool the refrigerant using traveling wind, and the compressor 1 is located inside an engine room because it is operated by an engine actuating belt. Therefore, the conventional air-conditioning system has a disadvantage in that connection of the pipes 5 becomes complicated.

In the meantime, in order to cool the interior of a vehicle, such as a truck, even in a state where the engine is not operated, an anti-start air-conditioner for a vehicle operated by a battery as a power source has been proposed. Such an anti-start air-conditioner for a vehicle is illustrated in FIGS. 3 and 4. FIG. 3 is a perspective view of the anti-start air-conditioner for the vehicle, and FIG. 4 is a schematic diagram of the anti-start air-conditioner for the vehicle. The anti-start air-conditioner for the vehicle includes: first and second compressors 10a and 10b operated by the battery for the vehicle as a power source; a lying-type condenser 20 including first and second condensing parts 20a and 20b, which are respectively communicated with the first and second compressors 10a and 10b and have condenser inlets 21 to which refrigerant is induced and condenser outlets 22 through which the induced refrigerant is discharged after exchanging heat with outside air; first and second capillary tubes 30a and 30b which are respectively communicated with the condenser outlets 22 formed in the first and second condensing parts 20a and 20b; and first and second evaporators 40a and 40b which are respectively communicated with the first and second capillary tubes 30a and 30b and have first evaporator inlets 41 to which refrigerant is induced and first evaporator outlets 42 through which the induced refrigerant is discharged to the first and second compressors 10a and 10b after exchanging heat with the inside air.

However, the conventional air-conditioning system for the vehicle uses engine cooling water in order to perform heating, and the anti-start air-conditioner for the vehicle must have a heater mounted to heat the interior of the vehicle even in the state where the engine is not operated.

Therefore, an apparatus, which can perform heating and cooling at the same time, has a compact size and is easily installed in a vehicle is demanded, and especially, an apparatus which can properly perform heating and cooling even in the state where the engine is stopped or is not in use is demanded.

SUMMARY

Accordingly, the present invention has been made in an effort to solve the above-mentioned problems occurring in the prior arts, and it is an object of the present invention to provide an air conditioning module, which can perform cooling and heating through a single module, is capable of being compact-sized, and is easy in installation.

To achieve the above objects, the present invention provides an air conditioning module including: a compressor for inhaling and compressing refrigerant; a condenser for condensing the refrigerant compressed in the compressor; expansion means for throttling the refrigerant condensed in the condenser; an evaporator, which evaporates the refrigerant supplied through the expansion means, and, of which the certain area is located at the upper part or the lower part in the height direction with respect to the condenser; and a housing.

Moreover, the air conditioning module further includes: a first blowing part for blowing air to pass through the condenser so as to be heated; a first door for adjusting a flow of the air passing through the condenser; a second blowing part for blowing air to pass through the evaporator so as to be cooled; a second door for adjusting a flow of the air passing through the evaporator.

In this instance, the air supplied through the first blowing part and the second blowing part by actuations of the first door and the second door is discharged to the interior of the vehicle or to the outside of the vehicle. Furthermore, the housing includes: a first inflow part hollowed at a certain area of the lower part thereof to transfer the air to the condenser; and a second inflow part hollowed at a certain area of the side thereof to transfer the air to the evaporator.

Additionally, the housing further includes: a first passageway, through which the air passing through the condenser is transferred to the interior of the vehicle, and in which the first blowing part and the first door are mounted; and a second passageway, through which the air passing through the evaporator is transferred to the interior of the vehicle, and in which the second blowing part and the second door are mounted.

In addition, the housing further includes: a first discharge passageway, which is operable and closable by the first door and extends from a first discharge hole hollowed at a certain area of the first passageway to discharge the air; and a second discharge passageway, which is operable and closable by the second door and extends from a second discharge hole hollowed at a certain area of the second passageway to discharge the air.

According to an embodiment of the present invention, the condenser and the evaporator are mounted horizontally. Here, the condenser includes: a pair of first header tanks spaced apart from each other at a predetermined interval and disposed side by side; a first tube of which both ends are fixed to the first header tanks to form a refrigerant passageway; a first pin interposed in the first tube; and a gas-liquid separator connected to the first header tanks, located at right angles to the direction that the first header tanks, the first tube and the first pin are formed to separate liquid-phase refrigerant from gas-phase refrigerant, and disposed on the first discharge passageway or the second discharge passageway. The evaporator includes: a pair of second header tanks; a second tube of which both ends are fixed to the second header tanks; and a second pin interposed in the second tube. The first header tanks positioned at one side of the condenser and the second header tanks positioned at the other side of the evaporator are respectively located at the upper part or the lower part in the height direction.

Moreover, the housing includes: a drain passageway formed in a lower space where the evaporator and the compressor are disposed; and a drain part formed at one side of the drain passageway to discharge condensate water. Furthermore, the housing further includes a first slope part and a second slope part, which block between the evaporator and the drain passageway and extend inclinedly in the downward direction from both side walls, and, of which certain areas of lower parts are overlapped with each other.

Additionally, the housing further includes: a partition part (871) formed for partitioning the drain passageway (851) from a space where the compressor 100 is mounted; and a hollow part (872) hollowed at a certain area of the partition part (871).

According to an embodiment of the present invention, the evaporator is located higher in the height direction than the condenser, and the first slope part and the second slope part are located below the evaporator and at the side of the condenser. Moreover, the first blowing part is located on the upper part of the condenser and at the side of the evaporator.

According to an embodiment of the present invention, the air condition module has an orifice form of which the inner space, through which the refrigerant passes, decreases gradually and increases gradually and is embedded in the housing. Furthermore, the first blowing part and the second blowing part adopt a cross flow fan type.

According to an embodiment of the present invention, in the case of heating, the first door closes the first discharge hole and opens the first passageway and the second door closes the second passageway and opens the second discharge hole such that the air heated by passing through the condenser is transferred to the interior of the vehicle through the first passageway and the air cooled by passing through the evaporator is discharged through the second discharge hole and the second discharge passageway. In the case of cooling, the second door closes the second discharge hole and opens the second passageway and the first door closes the first passageway and opens the first discharge hole such that the air cooled by passing through the evaporator is transferred to the interior of the vehicle through the second passageway and the air heated by passing through the condenser is discharged through the first discharge hole and the first discharge passageway.

In the meantime, the air conditioning module further includes actuating means linked with the first door and the second door to open and close the first door and the second door. The actuating means, which is connected with the first door and the second door, opens the first door and closes the second door, or closes the first door and opens the second door.

Furthermore, the actuating means opens the first door and the second door to a predetermined degree. The actuating means includes: a link member for connecting the first door and the second door with each other; and an actuator for actuating the link member. Here, the first door includes a first rotary shaft and a plate part extending from the first rotary shaft, and the second door includes a second rotary shaft, a pair of support part vertically extending in the form of a fan shape of which the center is connected with the second rotary shaft, and a closed part for connecting the outer peripheries of the support parts with each other. Additionally, the actuating means includes a first actuator, which actuates the first door, and a second actuator, which actuates the second door and is electrically connected with the first actuator.

Moreover, the air conditioning module further includes control means for controlling the first door and the second door such that the second door is actuated in the direction to discharge the air to the outside of the vehicle when the first door is actuated in the direction to discharge the air to the interior of the vehicle, and the second door is actuated in the direction to discharge the air to the interior of the vehicle when the first door is actuated in the direction to discharge the air to the outside of the vehicle.

As described above, the air conditioning module according to an embodiment of the present invention can perform cooling and heating through a single module, is capable of being compact-sized, and is easy in installation.

DETAILED DESCRIPTION OF EMBODIMENTS

Hereinafter, reference will be now made in detail to air conditioning module according to a preferred embodiment of the present invention with reference to the attached drawings.

Figure 1:
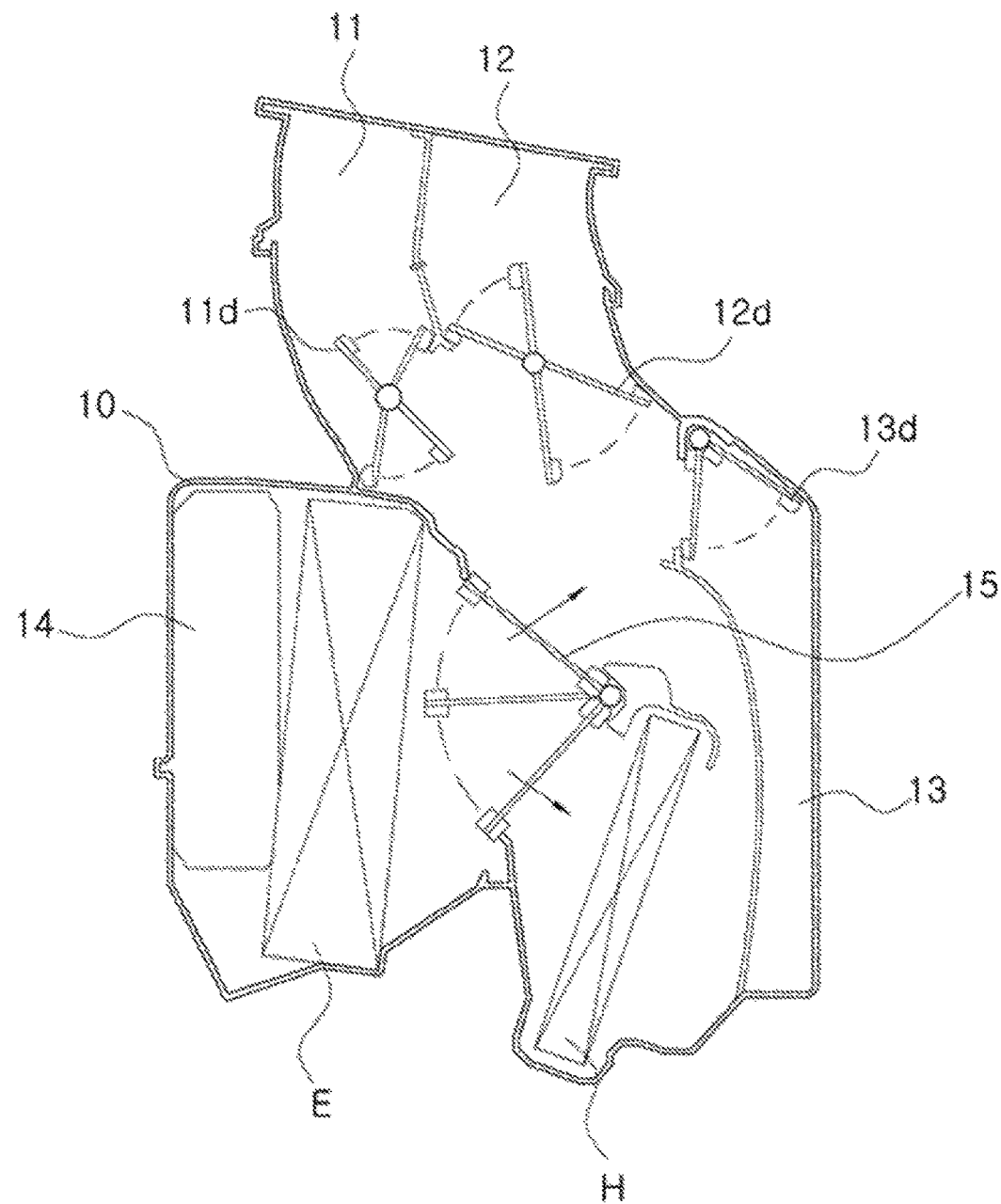
FIG. 1 is a schematic diagram showing a conventional air conditioner for a vehicle.
Figure 2:
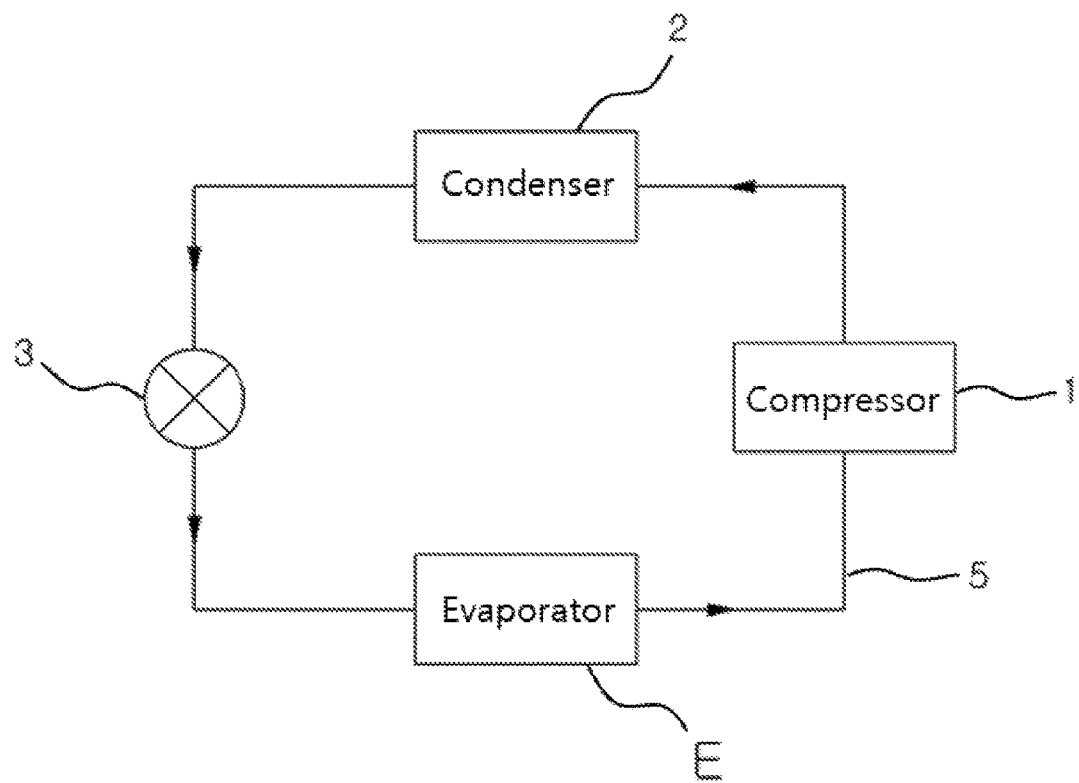
FIG. 2 is a schematic diagram showing a conventional air-conditioner cooling system.
Figure 3:
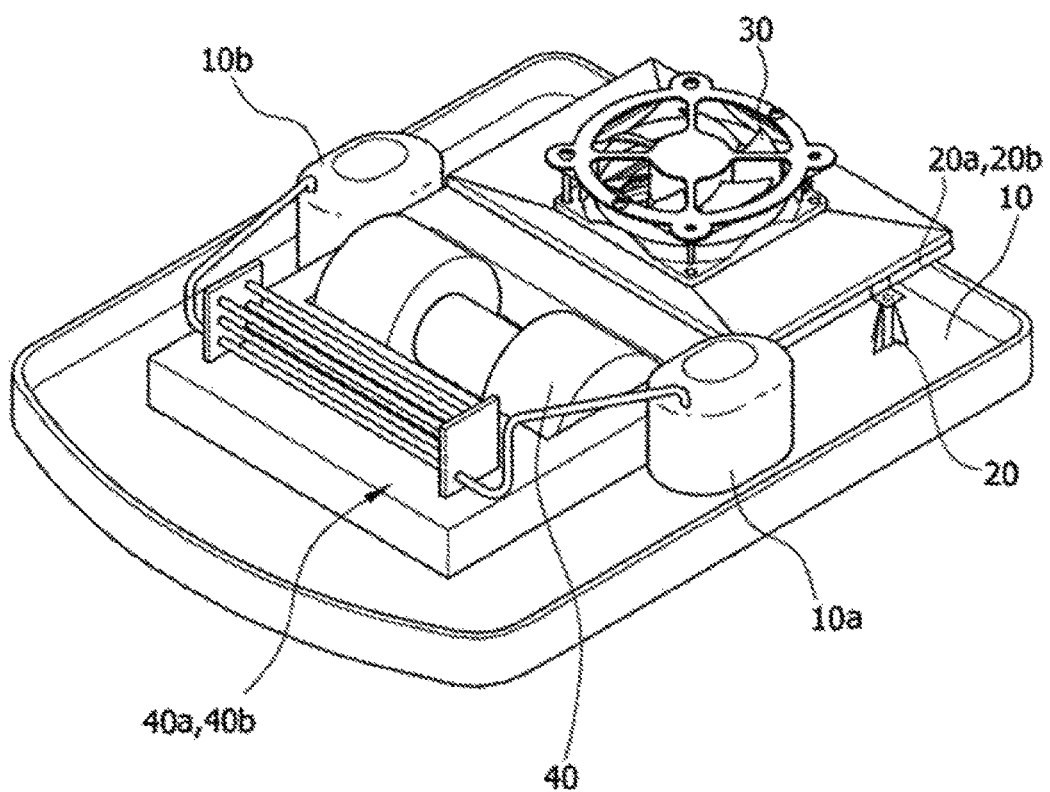
FIG. 3 is a perspective view and FIG. 4 is a schematic diagram of an anti-start air-conditioner for a vehicle.
Figure 4:
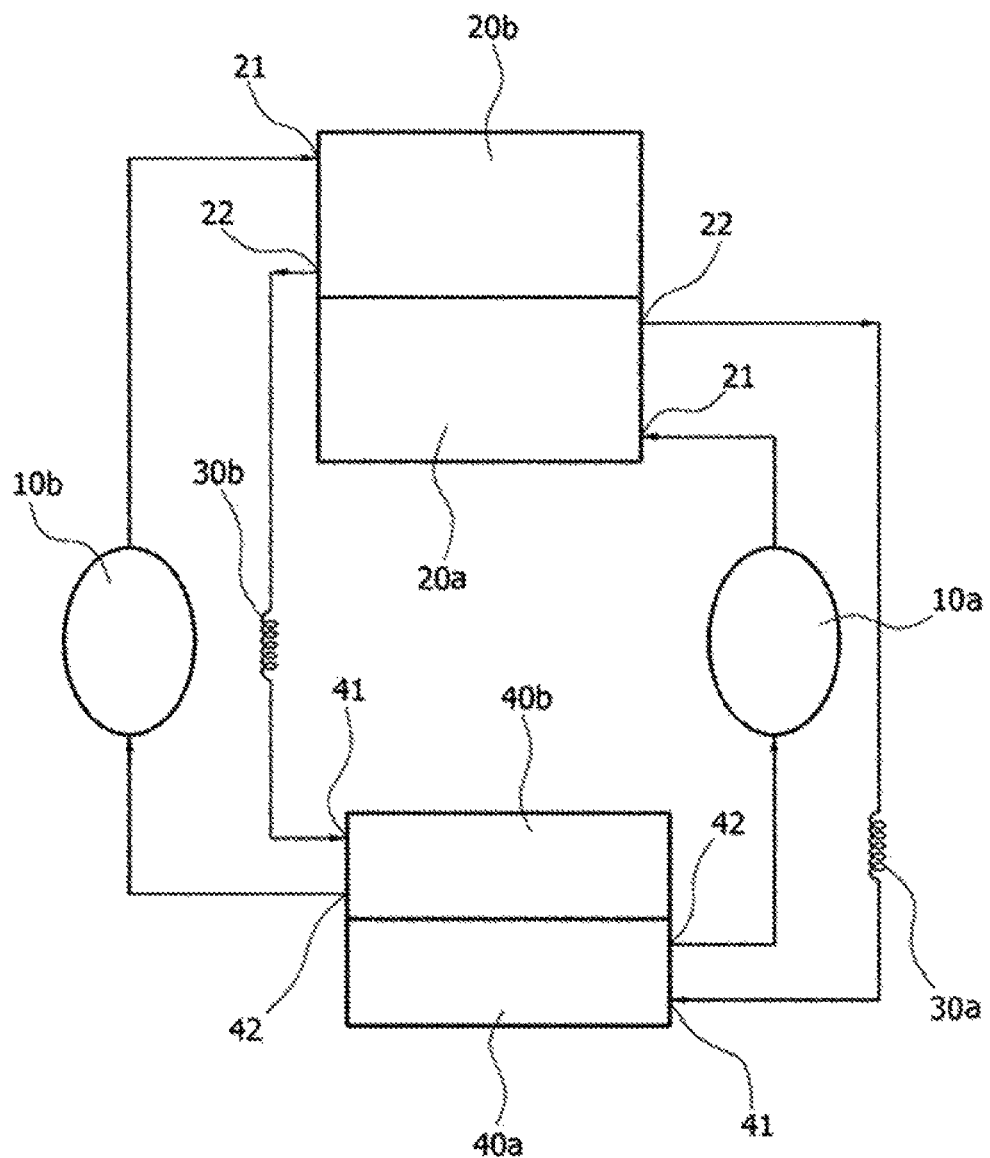
Figure 5:
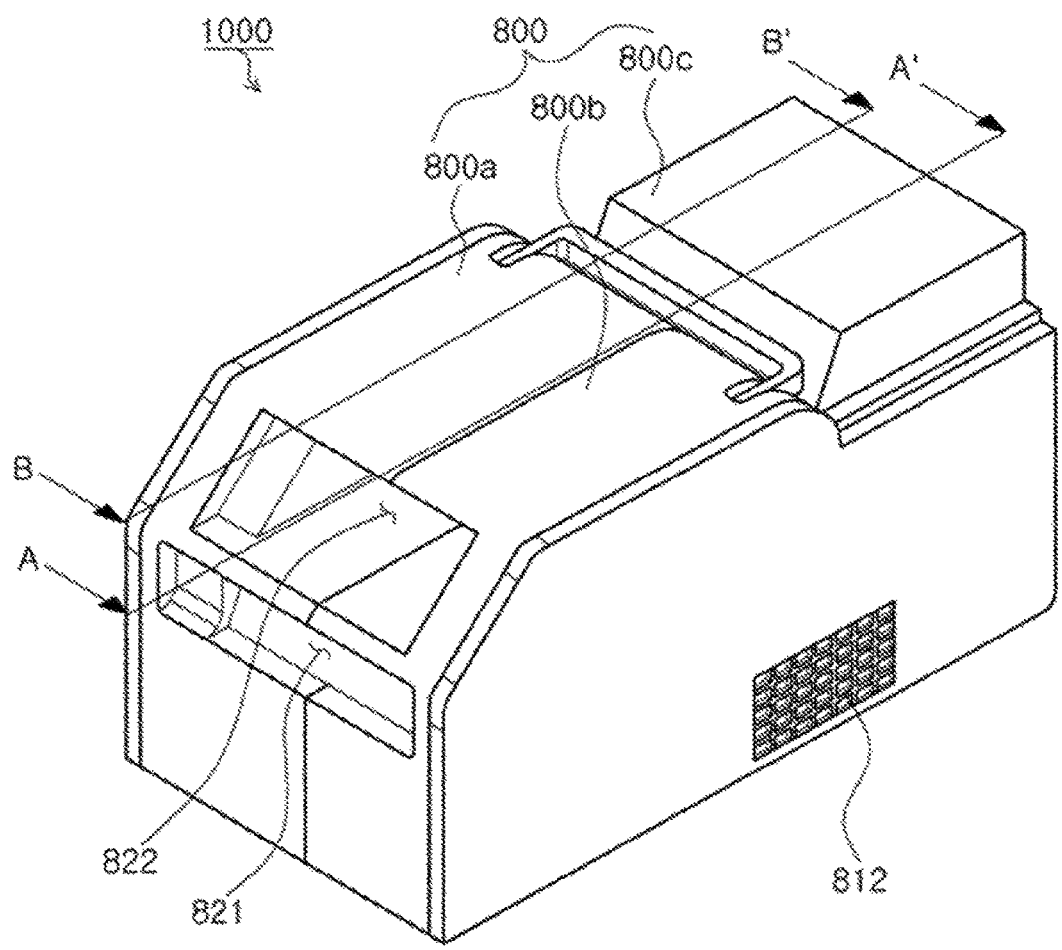
FIG. 5 is a perspective view and FIG. 6 is an exploded perspective view of an air conditioning module according to an embodiment of the present invention.
Figure 6:
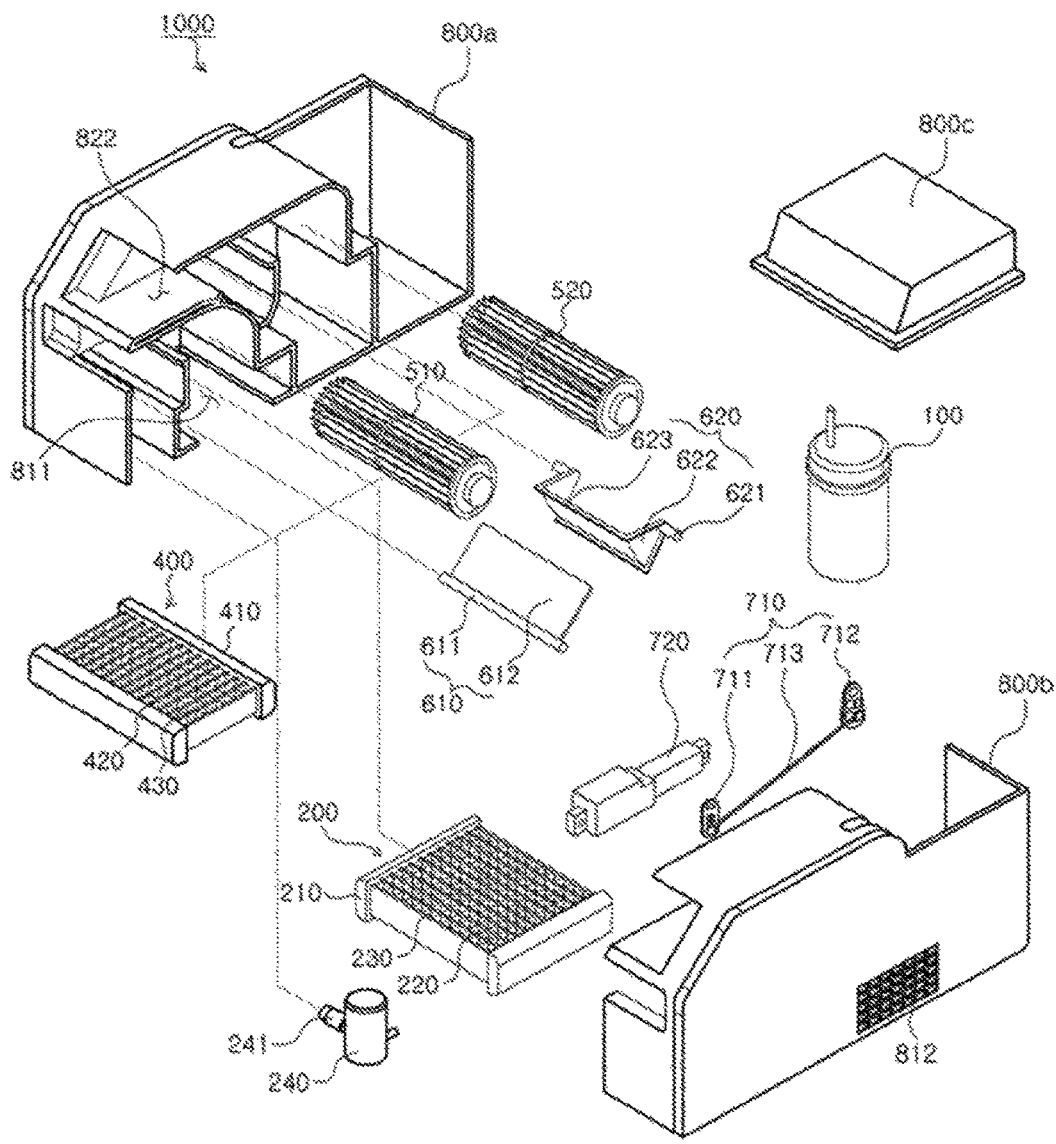
Figure 7:
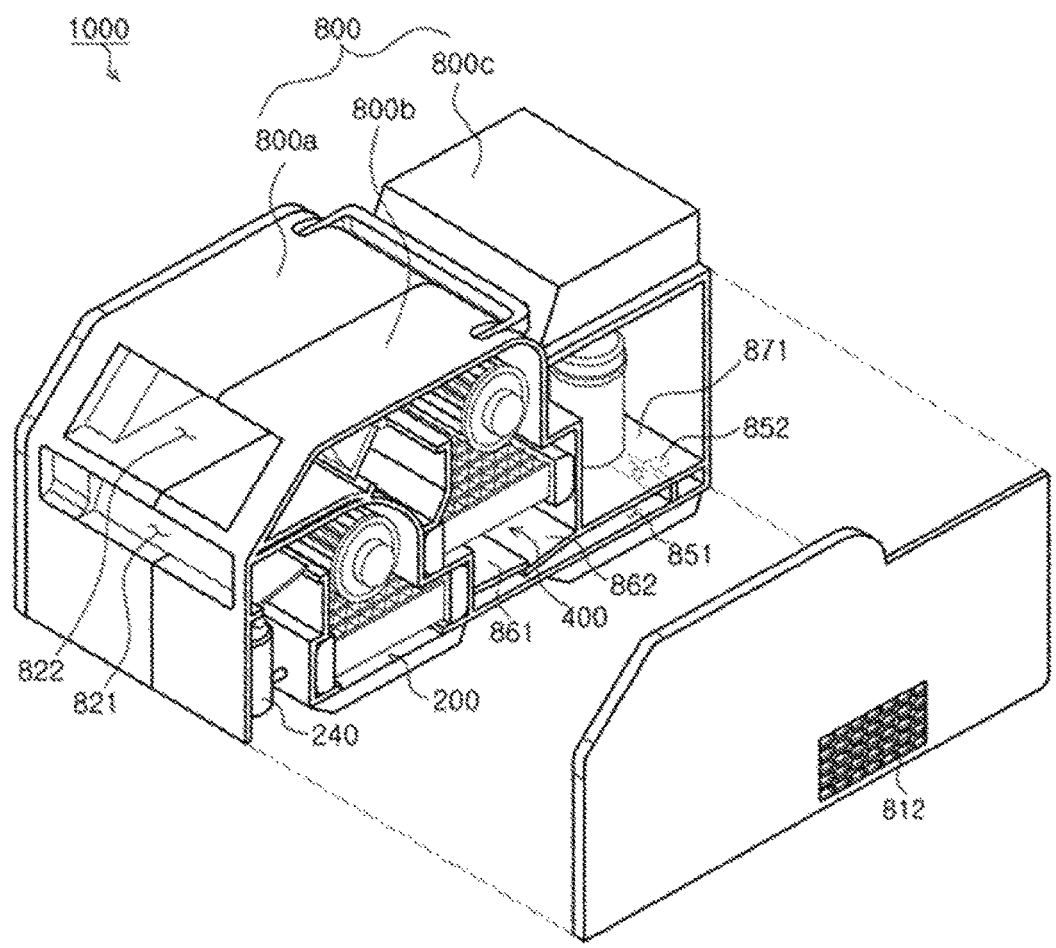
FIG. 7 is a perspective view and FIG. 8 is a plan view showing the inside of the air conditioning module according to the embodiment of the present invention.
Figure 8:
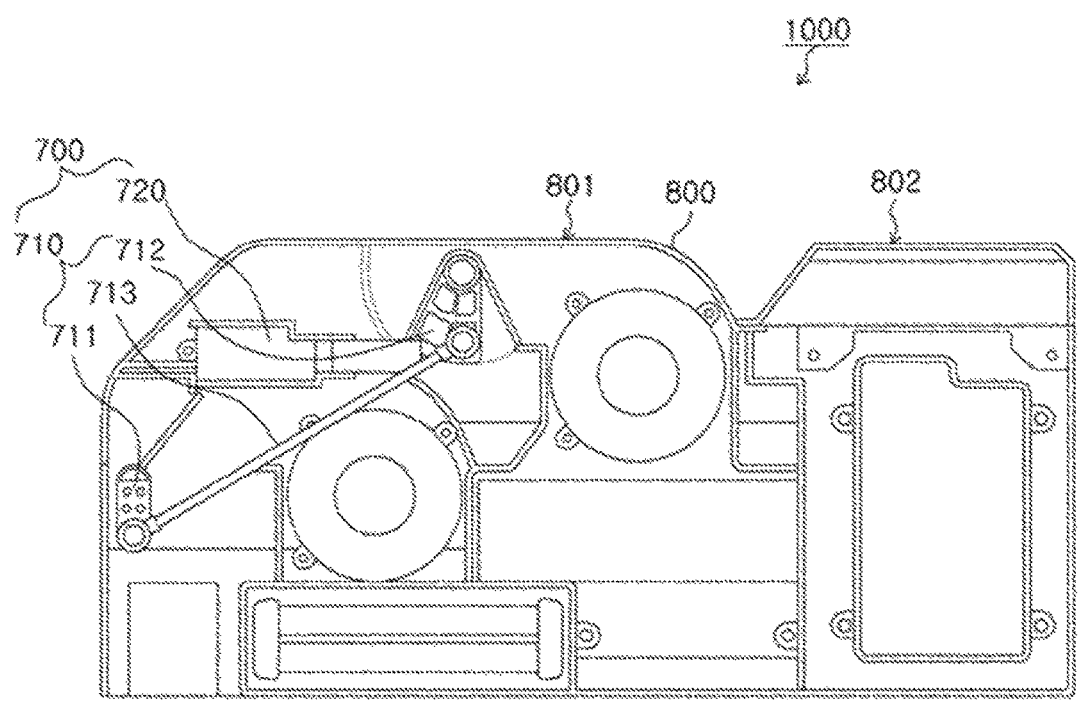
Figure 9:
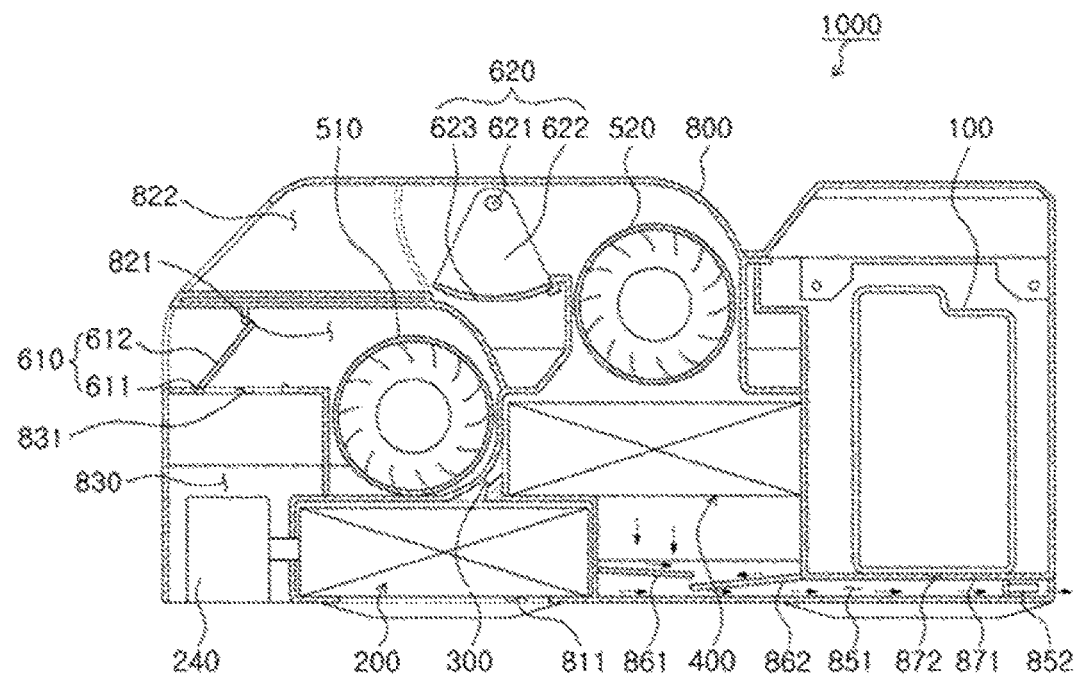
FIG. 9 is a sectional view taken along the line AA'.
Figure 10:
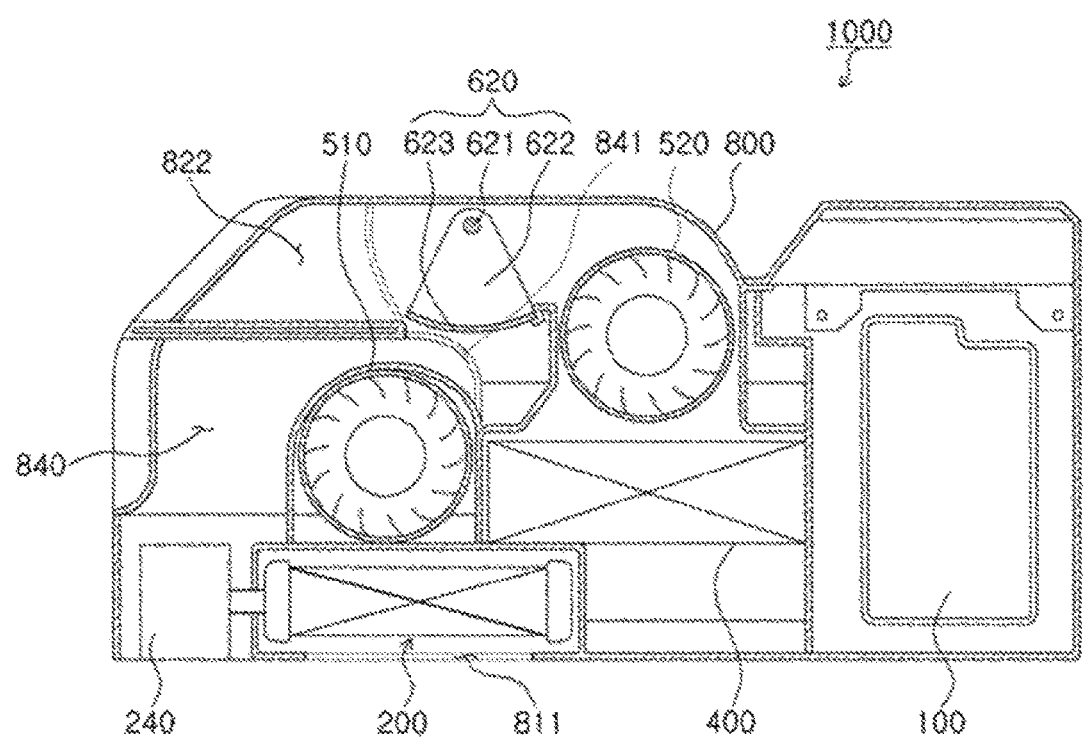
FIG. 10 is a sectional view taken along the line BB' in FIG. 5.
Figure 11:
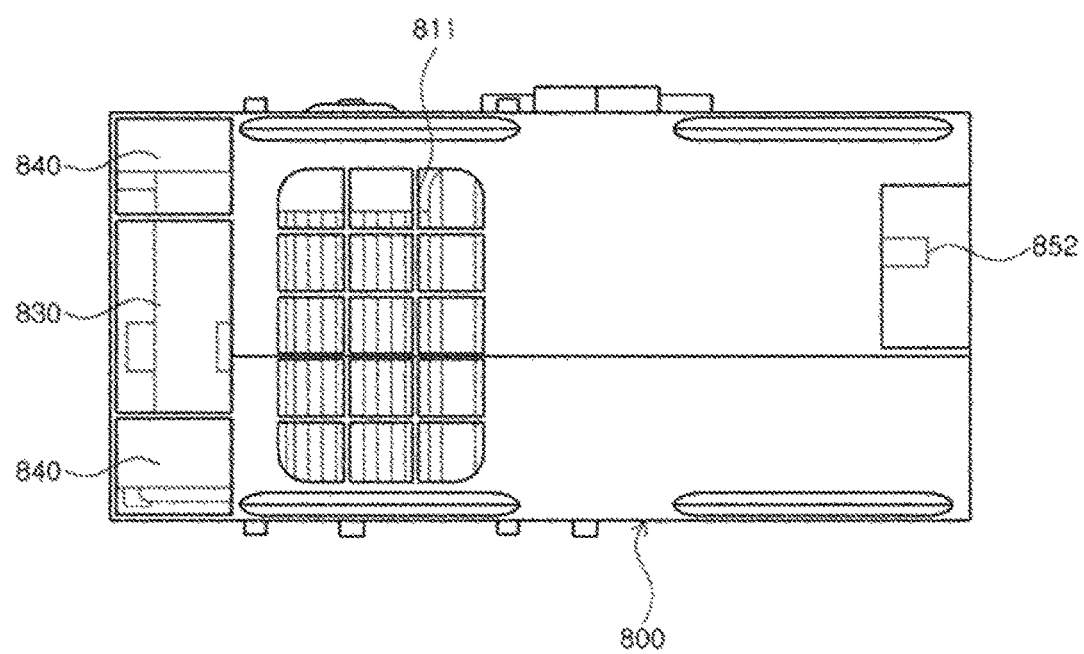
FIG. 11 is a bottom plan view of the air conditioning module according to the embodiment of the present invention.
Figure 12:
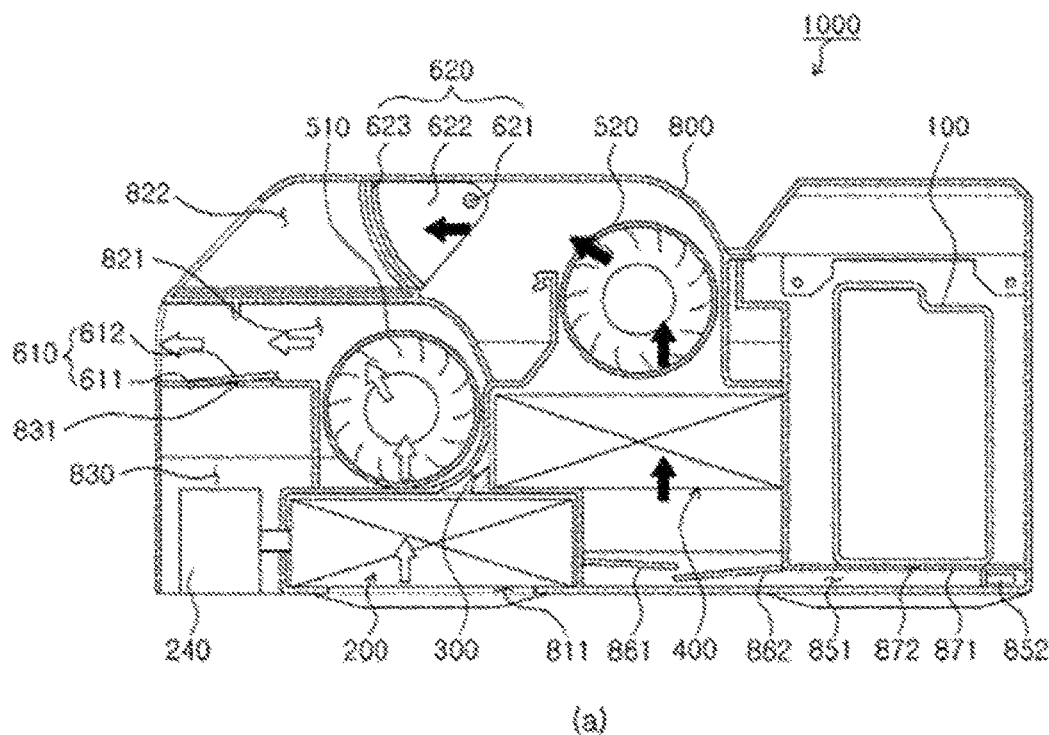
FIG. 12 is a view showing a heating state of the air conditioning module according to the embodiment of the present invention, wherein a flow of heated air supplied toward a passenger is indicated by hollow arrows, and a flow of cooled air discharged to the outside is indicated by black arrows.
Figure 12:
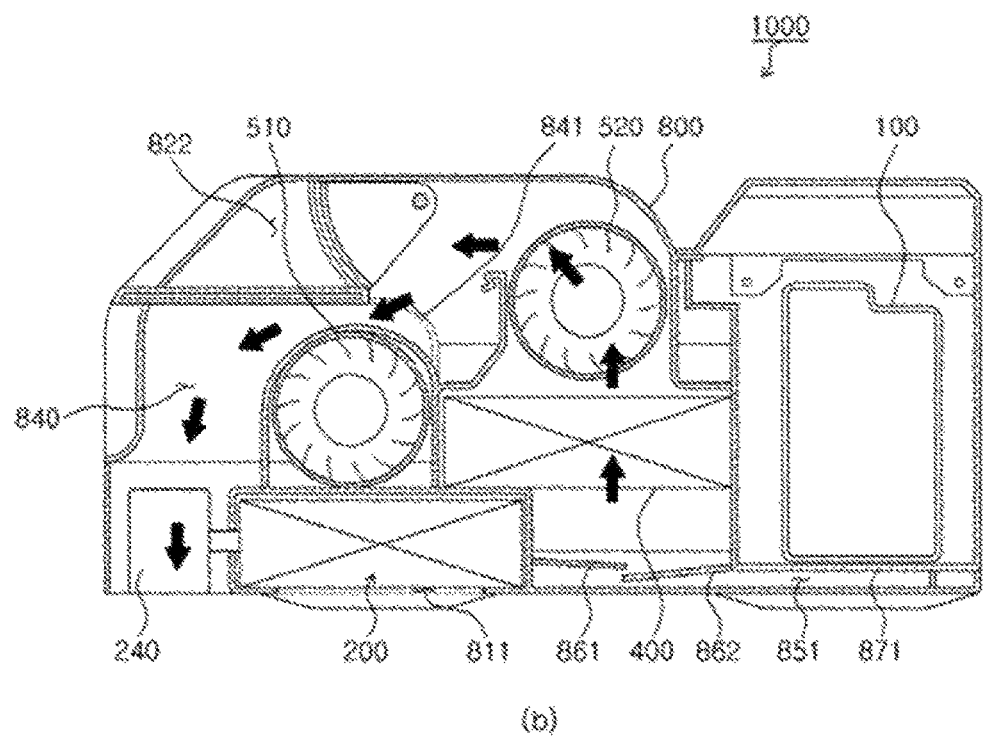
Figure 13:
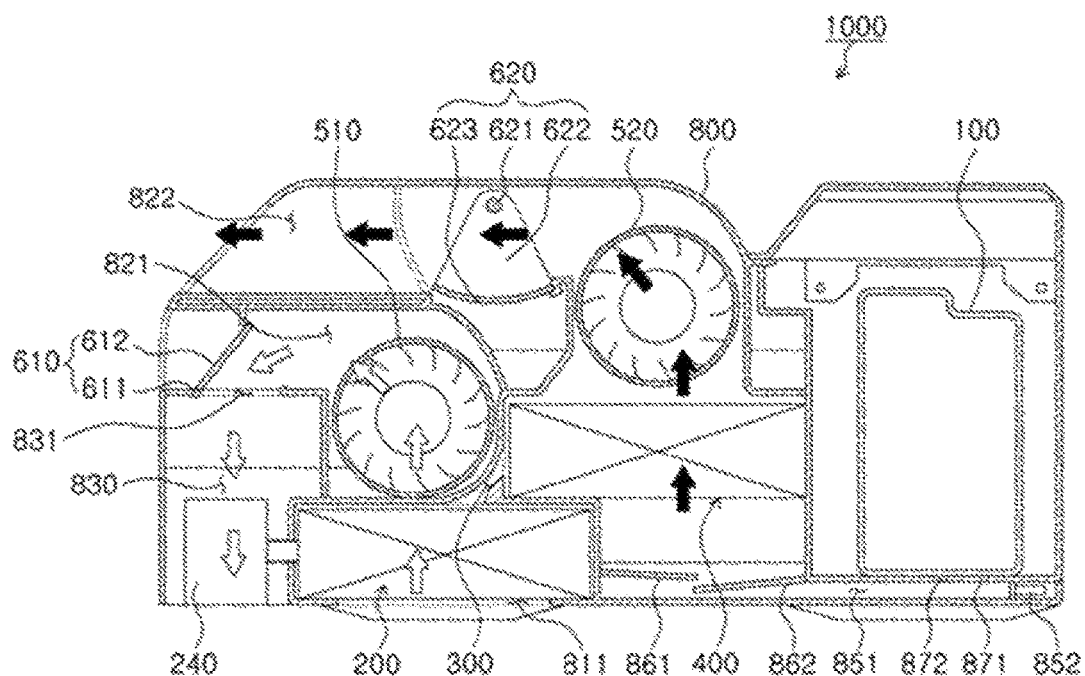
FIG. 13 is a view showing a cooling state of the air conditioning module according to the embodiment of the present invention, wherein a flow of cooled air supplied toward a passenger is indicated by black arrows, and a flow of heated air discharged to the outside is indicated by hollow arrows.

FIG. 5 is a perspective view and FIG. 6 is an exploded perspective view of an air conditioning module according to an embodiment of the present invention, FIG. 7 is a perspective view and FIG. 8 is a plan view showing the inside of the air conditioning module according to the embodiment of the present invention. FIG. 9 is a sectional view taken along the line AA', FIG. 10 is a sectional view taken along the line BB' in FIG. 5, and FIG. 11 is a bottom plan view of the air conditioning module according to the embodiment of the present invention. FIG. 12 is a view showing a heating state of the air conditioning module according to the embodiment of the present invention, wherein a flow of heated air supplied toward a passenger is indicated by hollow arrows, and a flow of cooled air discharged to the outside is indicated by black arrows, and FIG. 13 is a view showing a cooling state of the air conditioning module according to the embodiment of the present invention, wherein a flow of cooled air supplied toward a passenger is indicated by black arrows, and a flow of heated air discharged to the outside is indicated by hollow arrows.

The air conditioning module 1000 according to the embodiment of the present invention includes a compressor 100, a condenser 200, an expansion valve 300, an evaporator 400, a first blowing part 510, a first door 610, a second blowing part 520, a second door 620, and a housing 800.

The compressor 100 is to inhale and compress gas-phase refrigerant, and supplies the gas-phase refrigerant of high-temperature and high-pressure to the condenser 200. In this instance, the compressor 100 is operated by receiving a driving force by a power supply unit and a battery mounted inside the vehicle or an external power supply.

The condenser 200 condenses the gas-phase refrigerant into liquid of high-temperature and high-pressure by exchanging heat between the gas-phase refrigerant of high-temperature and high-pressure discharged from the compressor 100 and outside air, and then, discharges the liquid of high-temperature and high-pressure to the expansion valve 300. In this instance, the condenser 200 acts as a heating source for heating air passing through the condenser 200 when the refrigerant is condensed. As shown in FIG. 6, the condenser 200 includes: a pair of first header tanks 210 spaced apart from each other at a predetermined interval and disposed side by side to form a refrigerant passageway; a first tube 220 of which both ends are fixed to the first header tanks 210; a first pin 230 interposed in the first tube 220; and a gas-liquid separator 240 connected to the first header tanks 210 to separate liquid-phase refrigerant from gas-phase refrigerant. In this instance, the gas-liquid separator 240 is located to be perpendicular to the direction that the first header tanks 210, the first tube 220 and the first pin 230 are formed, is disposed on a first discharge passageway 830 or a second discharge passageway 840 of one side so as to maximize the formation area of the first header tanks 210, the first tube 220 and the first pin 230. Moreover, preferably, the air conditioning module may be compact-sized and sufficiently secure an area to exchange heat with air because the first blowing part 510 may be located near to the formation area of the first header tanks 210, the first tube 220 and the first pin 230.

In this instance, the gas-liquid separator 240 may include a body 241 having a desiccating agent therein and a refrigerant filling port 242 formed at one side of the body 241 so as to facilitate replenishment of refrigerant in the state where the condenser 200 is mounted. The housing 800 related with the above will be described later.

The expansion valve 300 rapidly expands the liquid-phase refrigerant of high-temperature and high-pressure discharged from the condenser 200 by a throttling action to make it into a wet saturated state of low-temperature and low-pressure, and discharges it to the evaporator 400.

The evaporator 400 exchanges heat between outside air and the liquid-phase refrigerant of low-pressure throttled in the expansion valve 300 to vaporize the refrigerant, and then, discharges it to the compressor 100. In this instance, the condenser 200 acts as a cooling source to cool the air passing through the evaporator 400 when the refrigerant is vaporized. In FIG. 6, the evaporator 400 includes a pair of second header tanks 410, a second tube 420 of which both ends are fixed to the second header tanks 410, and a second pin 430 interposed in the second tube 420.

In other words, the refrigerant circulates the compressor 100, the condenser 200, the expansion valve 300 and the evaporator 400 in order, and the compressor 100, the condenser 200, the expansion valve 300 and the evaporator 400 are connected with one another through pipes (not shown).

The first blowing part 510 is means for blowing air so that the air is heated after passing through the condenser 200, and the second blowing part 520 is means for blowing air so that the air is cooled after passing through the evaporator 400. The first blowing part 510 and the second blowing part 520 may adopt a cross flow fan type. In addition, the blowing parts 510 and 520 may adopt one of various types that can blow air to the condenser 200 and the evaporator 400.

The first door 610 regulates a flow of the air blown by the first blowing part 510, and transfers the air heated through the condenser 200 to the interior of the vehicle or discharges the heated air to the outside. Moreover, the second door 620 regulates a flow of the air blown by the second blowing part 520, and transfers the air cooled through the evaporator 400 to the interior of the vehicle or discharges the cooled air to the outside. In this instance, the first door 610 and the second door 620 may adopt one of various forms, and especially, the first door 610 includes a first rotary shaft 611 and a plate part 612 extending from the first rotary shaft 611, and the second door 620 includes a second rotary shaft 621, a pair of support part 622 vertically extending in the form of a fan shape of which the center is connected with the second rotary shaft 621, and a closed part 623 for connecting the outer peripheries of the support parts 622 with each other. That is, the first door 610 is opened such that the air flows by the plate part 612 to be supplied to the interior of the vehicle, or is closed such that the air is discharged to the outside. The second door 620 is opened such that the air flows by the closed part 623 to be supplied to the interior of the vehicle, or is closed such that the air is discharged to the outside.

The housing 800 has a space, in which the compressor 100, the condenser 200, the expansion means 300, the evaporator 400, the first blowing part 510, the first door 610, the second blowing part 520, and the second door 620 are mounted, and, in which the first door 610 and the second door 620 are selectively operated by the actuation of actuating means 700 so as to transfer the air supplied through the first blowing part 510 and the second blowing part 520 to the interior of the vehicle or to discharged the air to the outside.

In more detail, the housing 800 includes a first inflow part 811 and a second inflow part 812, which are hollow, and a first passageway 821 and a second passageway 822, which are formed therein to supply the heated or cooled air to the interior of the vehicle. The first inflow part 811 is a hollow area formed at a certain area of the housing 800 to transfer the air to the condenser 200, and the second inflow part 812 is a hollow area formed at a certain area of the housing 800 to transfer the air to the evaporator 400. In FIGS. 5 to 9, it is illustrated that the first inflow part 811 is formed on the bottom of the housing 800, and the second inflow part 812 is formed on the side of the housing 800 (the front side in FIGS. 5 to 7), but the first and second inflow parts 811 and 812 may be formed on one of various positions that can transfer the air to the condenser 200 and the evaporator 400.

The first passageway 821 is formed inside the housing 800 to form a space that the air passing through the condenser 200 is transferred to the interior of the vehicle, and the condenser 200, the first blowing part 510, and the first door 610 are mounted on the first passageway 821. Furthermore, the second passageway 822 is formed inside the housing 800 to form a space that the air passing through the evaporator 400 is transferred to the interior of the vehicle, and the evaporator 400, the second blowing part 520, and the second door 620 are mounted on the second passageway 822. In this instance, it is preferable that certain areas of the first and second passageways 821 and 822, which discharge air to the interior of the vehicle, be formed to be adjacent to each other in the height direction such that the first passageway 821 and the second passageway 822 facilitate designing a flow of air.

Moreover, the housing 800 includes a first discharge passageway 830 connected with the first passageway 821 and a second discharge passageway 840 connected with the second passageway 822 to discharge air, which is not supplied to the interior of the vehicle. The first discharge passageway 830 is openable and closable by the first door 610 and is a passageway formed by extending from a first discharge hole 831 hollowed at a certain area of the first passageway 821 to discharge air to the outside. Furthermore, the second discharge passageway 840 is openable and closable by the second door 620 and is a passageway formed by extending from a second discharge hole 832 hollowed at a certain area of the second passageway 822 to discharge air to the outside.

In other words, referring to FIG. 12 showing a heating state, the first door 610 opens the first passageway 821 to transfer the heated air to the interior of the vehicle, and closes the first discharge hole 831 to close a flow which discharges the heated air to the outside. In this instance, the second door 620 closes the second passageway 822 to prevent the cooled air from being transferred to the interior of the vehicle, and opens the second discharge hole 832 to discharge the cooled air to the outside. In FIG. 12, the flow of the heated air supplied to the interior of the vehicle is indicated by hollow arrows, and a flow of the cooled air discharged to the outside is indicated by black arrows, wherein FIG. 12A shows the air flow using the sectional view of FIG. 5 taken along the line AA', in which the first passageway 821, the second passageway 822 and the first discharge passageway 830 are formed, and FIG. 12B shows the air flow using the sectional view of FIG. 5 taken along the line BB', in which the second passageway 822 and the second discharge passageway 840 are formed.

On the contrary, referring to FIG. 13 showing a cooling state, the second door 620 opens the second passageway 822 to transfer the heated air to the interior of the vehicle, and closes the second discharge hole 832 to close a flow which discharges the cooled air to the outside. In this instance, the first door 610 closes the first passageway 821 to prevent the cooled air from being transferred to the interior of the vehicle, and opens the first discharge hole 831 to discharge the heated air to the outside.

In the meantime, in the air conditioning module 1000 according to the preferred embodiment of the present invention, the housing 800 may include a first housing 800a and a second housing 800b, which are combined at both sides in the longitudinal direction of the compressor 100, the condenser 200, the expansion means 300, the evaporator 400, the first blowing part 510, the first door 610, the second blowing part 520, and the second door 620. The compressor 100 is easy in mounting but may generate noise, so may be formed to be openable and closable by a cover 800c.

Additionally, in the air conditioning module 1000 according to the preferred embodiment of the present invention, preferably, the condenser 200 and the evaporator 400 are mounted horizontally, and the first header tanks 210 positioned at one side of the condenser 200 and the second header tanks 410 positioned at the other side of the evaporator 400 are respectively located at the upper part or the lower part in the height direction. It means that the direction that a pair of the first header tanks 210 of the condenser 200 are spaced apart from each other and the direction that a pair of the second header tanks 410 of the evaporator 400 are spaced apart from each other are the same. The first header tanks 210 and the second header tanks 410, which are adjacent to each other, are located at the upper part or the lower part in the height direction. That is, because the formation area of the first tube 220 and the first pin 230 of the condenser 200 and the formation area of the second tube 420 and the second pin 430 of the evaporator 400 are areas to exchange heat between air and internal refrigerant, when certain areas of the condenser 200 and the evaporator 400 are located at the upper part or the lower part in the height direction, the air conditioning module can become compact-sized and sufficiently secure heat-exchanging areas.

Moreover, in the air conditioning module 1000 according to the preferred embodiment of the present invention, condensate water may be formed on the surface of the evaporator 400 and the space where the compressor 100 is disposed, but it may deteriorate operation performance of each component and also deteriorate a passenger's comfort because the condensate water may cause an unpleasant smell. Therefore, in order to discharge the condensate water, the air conditioning module 1000 according to the preferred embodiment of the present invention further includes a drain passageway 851 formed in a lower space where the evaporator 400 and the compressor 100 are disposed and a drain part 852 formed at one side of the drain passageway 851 to discharge the condensate water. That is, the drain passageway 851 forms the space below the area, in which the evaporator 400 and the compressor 100 are mounted, to make the condensate water discharged out. Therefore, the condensate water flown into the drain passageway 851 is discharged out by the drain part 852. In this instance, in the present invention, it is defined that the area overlapped with the condenser 200 in the height direction is excluded from the lower area of the evaporator 400, in which the drain passageway 851 is formed.

Furthermore, the air conditioning module 1000 according to the preferred embodiment of the present invention may further include a first slope part 861 and a second slope part 862 formed in the housing 800. The first and second slope parts 861 and 862 block between the evaporator 400 and the drain passageway 851 and are inclined in the downward direction from both side walls in order to guide the condensate water to the drain passageway 851 and to prevent the condensate water of the drain passageway 851 from splashing to the evaporator 400 because the certain areas of the lower parts thereof are overlapped. In FIG. 9, a discharge flow of the condensate water is indicated by solid line arrows.

Additionally, the area where the compressor 100 is disposed includes: a partition part 871 formed for partitioning the compressor 100 from the drain passageway 851; and a hollow part 872 hollowed at a certain area of the partition part 871, such that the compressor 100 can be mounted stably and the condensate water can be easily discharged out.

In addition, in the air conditioning module 1000 according to the preferred embodiment of the present invention, the evaporator 400 is located higher in the height direction than the condenser 200, and the first slope part 861 and the second slope part 862 are located below the evaporator 400 and at the side of the condenser 200 such that the condensate water formed on the surface of the evaporator 400 can be easily collected.

Moreover, the housing 800 may become compact-sized because the first blowing part 510 is located on the upper part of the condenser 200 and on the side of the evaporator 400.

Furthermore, the expansion means 300 may be embedded in the housing 800. As described above, because the refrigerant circulates the compressor 100, the condenser 200, the expansion valve 300 and the evaporator 400 in order, the expansion means 300 is embedded in the area of the housing 800, which partitions the condenser 200 from the evaporator 400, and a pipeline in which the refrigerant discharged from the condenser 200 flows and a pipeline in which refrigerant is supplied to the evaporator 400 may be connected to the area where the expansion means 300 is formed. Particularly, the expansion means 300 may have an orifice form of which the inner space decreases gradually and increases gradually because the expansion means 300 corresponds to an area formed in the housing 800 as the space through which the refrigerant passes (See FIG. 9). Therefore, the air conditioning module 1000 according to the preferred embodiment of the present invention can reduce the number of components and time and costs required for assembly because there is no need to additionally prepare and assemble the expansion means 300.

In the meantime, the air conditioning module 1000 according to the preferred embodiment of the present invention may further include actuating means 700 for actuating the first door 610 and the second door 620. The actuating means 700 opens the first door 610 and closes the second door 620, or closes the first door 610 and opens the second door 620. That is, the actuating means 700 makes the first door 610 and the second door 620 work together. The actuating means 700 controls in such a way that the second door 620 is closed when the first door 610 is opened and the second door 620 is opened when the first door 610 is closed. Furthermore, the air conditioning module 1000 according to the preferred embodiment of the present invention may open the second door 620 to a certain degree while opening the first door 610 to a certain degree according to the passenger's desired temperature because the air conditioning module 1000 can open the first door 610 and the second door 620 to a desired degree individually.

In an embodiment, the actuating means 700 includes a link member 710 for connecting the first door 610 and the second door 620 with each other and an actuator 720 for actuating the link member 710. The link member 710 includes a first door lever 711 combined with a first rotary shaft 611 of the first door 610, a second door lever 712 combined with a second rotary shaft 621 of the second door 620, and a connection link 713 for connecting the first door lever 711 and the second door lever 712 with each other. In the case that the first door lever 711 and the first rotary shaft 611 connected with the first door lever 711 are rotated by operation of the actuator 720 to open the first door 610, the second door lever connected through the connection link 713 and the second rotary shaft 621 connected with the second door lever are also rotated to close the second door 620. Moreover, in the case that the first door lever and the first rotary shaft 611 connected with the first door lever are rotated by operation of the actuator 720 to close the first door 610, the second door lever connected through the connection link 713 and the second rotary shaft 621 connected with the second door lever are also rotated to open the second door 620.

In another embodiment, the actuating means 700 includes a first actuator (not shown), which actuates the first door 610, and a second actuator (not shown), which actuates the second door 620 and is electrically connected with the first actuator. That is, the actuating means 700 includes all of the first actuator for actuating the first door 610 and the second actuator for actuating the second door 620 and controls the first actuator and the second actuator, which are linked with each other in their operations. Therefore, the air conditioning module 1000 according to the present invention is easy to work because the first door 610 and the second door 620 are controlled to operate together.

The air conditioning module 1000 described above can be used as an apparatus for cooling and heating the interior of the vehicle because performing not only cooling but also heating as a single unit. Additionally, because the air conditioning module 1000 according to the present invention can be detachably mounted on the vehicle by a passenger, it can be detached from the vehicle and used outside the vehicle if there is a need to adjust temperature outside the vehicle. In the present invention, the "passenger" may be interpreted as a "user", who uses the air conditioning module 1000 outside the vehicle, and the direction may be the side that air is discharged through the first passageway 821 and the second passageway 822. During outdoor activities, if air conditioning is needed, the air conditioning module 1000 according to the present invention may be operated by a battery of the vehicle or an external power supply. Moreover, the air conditioning module 1000 may be mounted at one of various places from which the air conditioning module 1000 can be attached and detached. As an example, the air conditioning module 1000 can be mounted on a glove box, a console box, a space between the rear seat and the rear window, or the floor of the vehicle. The present invention is not restricted to the above, and the air conditioning module 1000 can be mounted at any place where the air conditioning module 1000 can be detachably mounted. The air conditioning module 1000 according to the present invention may be controlled by a main control system of the vehicle, or controlled independently from the main control system. In other words, the air conditioning module 1000 according to the present invention may be operated independently from the main control system, which controls interior air conditioning of the vehicle, regardless the cases that the air conditioning module performs interior air conditioning of the vehicle or is used outside the vehicle.

While the present invention has been particularly shown and described with reference to exemplary embodiments thereof, it will be understood by those of ordinary skill in the art that various changes in form and details may be made therein without departing from the spirit and scope of the present invention as defined by the following claims.

The air conditioning module according to the preferred embodiment of the present invention is an apparatus, which may be applied to air conditioners for various vehicles, to heat or cool the interior of the vehicle or to defrost the windshield of the vehicle. So, the air conditioning module is used as a car internal, which offers convenience for a driver.

The invention claimed is:

1. An air conditioning module comprising:
a compressor for inhaling and compressing a refrigerant;
a condenser for condensing the refrigerant compressed in the compressor;
expansion means for throttling the refrigerant condensed in the condenser;
an evaporator, which evaporates the refrigerant supplied through the expansion means, and, of which a certain area is located at an upper part or a lower part in a height direction with respect to the condenser;
a housing;
a first blowing part for blowing air to pass through the condenser to be heated;
a first door for adjusting a flow of the air passing through the condenser;
a second blowing part for blowing air to pass through the evaporator to be cooled; and
a second door for adjusting a flow of the air passing through the evaporator, wherein the air supplied through the first blowing part and the air supplied through the second blowing part by actuations of the first door and the second door is discharged to an interior of a vehicle or to outside of the vehicle, wherein the housing comprises:
a drain passageway formed in a lower space where the evaporator and the compressor are disposed;
a drain part formed at one side of the drain passageway to discharge condensate water; and
a first slope part and a second slope part, which block between the evaporator and the drain passageway and extend inclinedly in a downward direction from both side walls of the housing, and, of which certain areas of lower parts of the first slope part and the second slope part are overlapped with each other.

2. The air conditioning module according to claim 1, wherein the housing comprises:
a first inflow part hollowed at a certain area of a lower part thereof to transfer the air to the condenser; and
a second inflow part hollowed at a certain area of a side thereof to transfer the air to the evaporator.

3. The air conditioning module according to claim 2, wherein the housing further comprises:
a first passageway, through which the air passing through the condenser is transferred to the interior of the vehicle, and in which the first blowing part and the first door are mounted; and
a second passageway, through which the air passing through the evaporator is transferred to the interior of the vehicle, and in which the second blowing part and the second door are mounted.

4. The air conditioning module according to claim 3, wherein the housing further comprises:
a first discharge passageway operable and closable by the first door and extends from a first discharge hole hollowed at a certain area of the first passageway to discharge the air; and
a second discharge passageway operable and closable by the second door and extends from a second discharge hole hollowed at a certain area of the second passageway to discharge the air.

5. The air conditioning module according to claim 4, wherein the condenser comprises:
a pair of first header tanks spaced apart from each other at a predetermined interval and disposed side by side;
a first tube of which both ends are fixed to the first header tanks to form a refrigerant passageway;
a first pin interposed in the first tube; and
a gas-liquid separator connected to the first header tanks, located at right angles to a direction the first header tanks, the first tube and the first pin are formed to separate a liquid-phase refrigerant from a gas-phase refrigerant, and disposed on the first discharge passageway or the second discharge passageway,
wherein the evaporator comprises:
a pair of second header tanks;
a second tube of which both ends are fixed to the second header tanks; and
a second pin interposed in the second tube, and wherein the first header tanks positioned at a side of the condenser and the second header tanks positioned at a side of the evaporator are respectively located at the upper part or the lower part in the height direction.

6. The air conditioning module according to claim 4, wherein during heating, the first door closes the first discharge hole and opens the first passageway and the second door closes the second passageway and opens the second discharge hole such that the air heated by passing through the condenser is transferred to the interior of the vehicle through the first passageway and the air cooled by passing through the evaporator is discharged through the second discharge hole and the second discharge passageway, and wherein during cooling, the second door closes the second discharge hole and opens the second passageway and the first door closes the first passageway and opens the first discharge hole such that the air cooled by passing through the evaporator is transferred to the interior of the vehicle through the second passageway and the air heated by passing through the condenser is discharged through the first discharge hole and the first discharge passageway.

7. The air conditioning module according to claim 1, wherein the condenser and the evaporator are mounted horizontally.

8. The air conditioning module according to claim 1, wherein the housing further comprises:
   a partition part formed for partitioning the drain passageway from a space where the compressor is mounted; and
   a hollow part hollowed at a certain area of the partition part.

9. The air conditioning module according to claim 1, wherein the evaporator is located higher in the height direction than the condenser, and the first slope part and the second slope part are located below the evaporator and at a side of the condenser.

10. The air conditioning module according to claim 9, wherein the first blowing part is located on an upper part of the condenser and at a side of the evaporator.

11. The air conditioning module according to claim 1, wherein the air conditioning module has the expansion means of an orifice form of which an inner space, through which the refrigerant passes, decreases gradually and increases gradually and is embedded in the housing.

12. The air conditioning module according to claim 1, wherein the first blowing part and the second blowing part adopt a cross flow fan type.

13. The air conditioning module according to claim 1, further comprising actuating means linked with the first door and the second door to open and close the first door and the second door.

14. The air conditioning module according to claim 13, wherein the actuating means opens the first door and the second door to a predetermined degree.

15. The air conditioning module according to claim 13, wherein the actuating means comprises:
   a link member for connecting the first door and the second door with each other; and
   an actuator for actuating the link member.

16. The air conditioning module according to claim 15, wherein the first door comprises a first rotary shaft and a plate part extending from the first rotary shaft, and wherein the second door comprises a second rotary shaft, a pair of support parts vertically extending in the form of a fan shape of which a center is connected with the second rotary shaft, and a closed part for connecting outer peripheries of the support parts with each other.

17. The air conditioning module according to claim 13, wherein the actuating means comprises a first actuator, which actuates the first door, and a second actuator, which actuates the second door and is electrically connected with the first actuator.

18. The air conditioning module according to claim 1, wherein the first door and the second door are controlled such that the second door is actuated in a direction to discharge the air to the outside of the vehicle when the first door is actuated in a direction to discharge the air to the interior of the vehicle, and the second door is actuated in a direction to discharge the air to the interior of the vehicle when the first door is actuated in a direction to discharge the air to the outside of the vehicle.

* * * * *